CARRIER OPERATED RELAY CIRCUIT

Filed May 24, 1956 2 Sheets-Sheet 1

INVENTOR.
CHARLES ROSEN
BY Edward M. Farrell
ATTORNEY

CARRIER OPERATED RELAY CIRCUIT

Filed May 24, 1956

INVENTOR.
CHARLES ROSEN
BY Edward M. Farrell
ATTORNEY 2,914,711
Patented Nov. 24, 1959

2,914,711

CARRIER OPERATED RELAY CIRCUIT

Charles Rosen, Philadelphia, Pa., assignor to Tele-Dynamics Inc., a corporation of Pennsylvania Application May 24, 1956, Serial No. 587,146

6 Claims. (Cl. 317—149)

This invention relates to control circuits, and more particularly to carrier operated relay circuits associated with radio receivers.

In the development of the guided missile and pilotless aircraft, a guidance receiver is often used to receive signals to actuate devices which control various functions within the missile or aircraft. Such devices generally include relays adapted to be operated when carrier signals of predetermined amplitudes are applied to the receiver.

In the absence of a carrier signal, it is desirable that the relay remain inoperative. However, very often the output noise from the guidance receiver is relatively high and causes spurious responses of the relay. Such spurious responses actuating the relay result in faulty operation of functions within the guided missile or aircraft. Various interfering signals other than noise may also actuate carrier operated relays to cause faulty operation of functions within the missile or aircraft.

In guidance receiver systems utilizing a carrier operated relay, the amplitude of an incoming carrier signal must generally be of a predetermined value to overcome a certain threshold level, as determined by a setting of a threshold control, to actuate the relay. If the threshold level is set too low, the carrier operated relay may be actuated by a relatively weak carrier signal, by noise or by interfering signals close to the carrier frequency. On the other hand, if the threshold level is set too high, the relay will become actuated only when a relatively strong carrier signal is applied to the system. Signals below the threshold level will not ordinarily actuate a carrier operated relay. However, it is often desirable to set the threshold level low and have the relay actuated when an incoming carrier signal is relatively weak.

The carrier signal strength, as well as the amplitude of noise and interfering signals, is different at different times, dependent largely upon the environmental conditions in which the receiver operates, the distance between the transmitter and receiver employed in the system and upon numerous other factors. For this reason, it is necessary that an operator set the threshold level control prior to a flight of an associated missile or aircraft.

A problem often encountered in carrier operated relay circuits is the relatively large differential between the on and off points of opration of the relay. In many situations, a predetermined input voltage to a system will cause a relay to become operated or "on." After the relay has been made operative, the same input voltage must generally be much lower in order to render the same relay inoperative or "off." The ratio of the input voltage required to operate a relay compared to the input voltage required to render the relay inoperative is commonly referred to as the "on-off" differential. In some applications, the threshold level setting is critical. It is important that a carrier signal of a certain amplitude actuate the relay and that the relay become inoperative when the carrier signal falls below that amplitude. For low-level carrier signals, especially in a region where an A.G.C. voltage is normally not generated in the conventional receiver, it is difficult to obtain a low on-off relay differential. For example, it is sometimes necessary to set the threshold level slightly above the random noise of the receiver.

It is an object of this invention to provide an improved relay circuit wherein the on-off differential of a relay is minimized.

It is a further object of this invention to provide a carrier operated relay circuit for minimizing the on-off differential of the relay for relatively weak carrier signals.

It is still a further object of this invention to provide an improved carrier operated relay circuit, in which a threshold level setting will be effective for carrier signals of widely varying amplitudes and in which the on-off differential of the associated relay is minimized.

In accordance with the present invention, a relay is provided to connect a receiver output circuit to a utilization circuit when a carrier signal of a predetermined amplitude is applied to the receiver. The relay is adapted to be actuated by a current therethrough and has its current path serially connected with the current path of an electron discharge device. A control voltage corresponding in amplitude to the carrier signal is applied to an amplifier. A feedback arrangement including rectifying means couples the output circuit of the amplifier to its input circuit. The output voltage from the amplifier is applied to the electron discharge device to control the operation of the relay. The feedback arrangement increases the control of the relay operation for weak signals and minimizes the on-off relay differential.

Other objects and advantages of the present invention will be apparent and suggest themselves to those skilled in the art to which the invention is related, from a reading of the following specification in connection with the accompanying drawing, in which.

Figure 1:
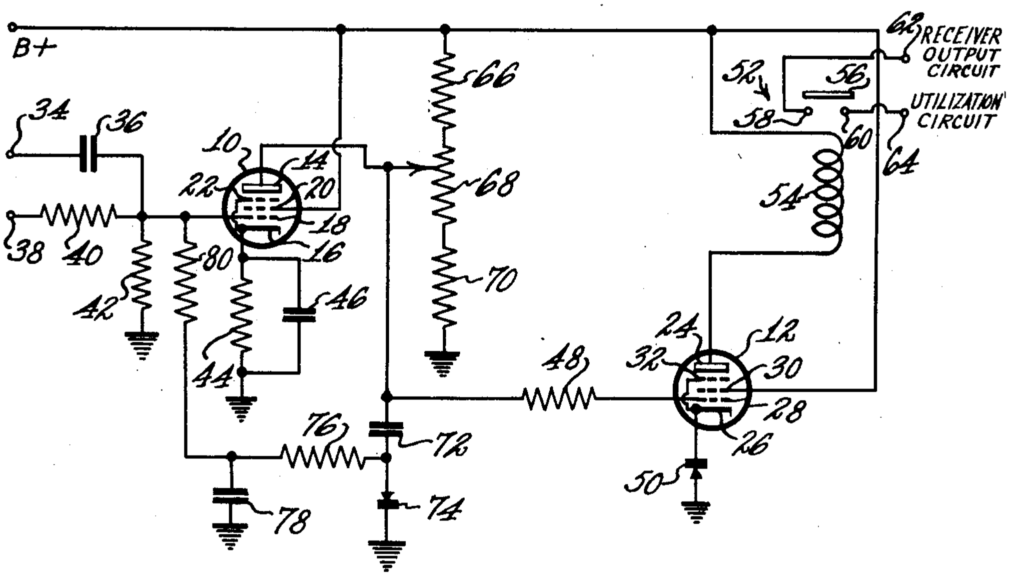
Figure 1 is a schematic representation of a carrier operated relay circuit, in accordance with the present invention.

Referring particularly to Figure 1, a D.C. coupled amplifier comprises two electron discharge devices 10 and 12 in the form of pentode tubes. The electron discharge device 10 comprises an anode 14, a cathode 16, a control grid 18, a screen grid 20 and a suppressor grid 22. The electron discharge device 12 comprises an anode 24, a cathode 26, a control grid 28, a screen grid 30 and a suppressor grid 32. Suppressor grids 22 and 32 are connected to cathodes 16 and 26, respectively. The anodes 14, 24 and the screen grids 20 and 30 are connected to a source of operating potential, designated as B+.

An input terminal 34, which may be connected to an intermediate frequency (I.F.) stage of a receiver, for example, is connected to the control grid 18 of the discharge device 10 through a coupling capacitor 36. A second input terminal 38, which may be connected to a source of automatic gain control (A.G.C.) voltage in a receiver, is connected to the control grid 18 through a resistor 40. A grid leak resistor 42 is connected between the control grid 18 and a point of reference potential designated as ground. Self-biasing means for the discharge device 10 are provided by a resistor 44 and a capacitor 46 connected in parallel relationship between the cathode 16 and ground.

The anode 14 is connected to the control grid 28 of the electron discharge device 12 through a resistor 48. A diode 50 is connected between the cathode 26 and ground to provide self-biasing means for the discharge device 12. A relay 52 comprises a coil 54, a movable contact member 56 and a pair of fixed contacts 58 and 60. The anode 24 is connected to B+ through the coil 54. The contact 58 is connected to a terminal 62, which may, for example, be connected to an output circuit of a guidance receiver. The contact 60 is connected to a terminal 64 which may be connected to a utilization circuit to control the operation of a certain function within a missile, pilotless aircraft or other device.

A threshold level control is provided by the resistors 66, 68, and 70, with the resistor 68 being variable to control the potential of the control grid 28 with respect to the cathode 26.

A regenerative feedback circuit from the anode 14 to the control grid 18, to be hereinafter described in detail, comprises a capacitor 72, a diode 74, a resistor 76, a capacitor 78 and a resistor 80.

In the circuit shown, direct coupling from the anode 14 to the control grid 28 is employed with the D.C. potential at the two electrodes being substantially the same and determined by the setting of the variable resistor 68. The voltage of the control grid 28 is made negative with respect to the voltage at the cathode 26 since it is desired to bias the discharge device 12 close to cut-off so that the current through the coil 54 is normally not sufficient to actuate the relay 52. The amount of negative bias is determined by the setting of the variable resistor 68. The voltage at the anode 14 is relatively low and the gain of the discharge device 10 is limited.

The carrier operated relay 52 is maintained inoperative in the absence of a carrier signal or when the carrier signal is weaker than that necessary to overcome the threshold level to operate the relay, as determined by the setting of the variable resistor 68. The electron discharge device 12 is biased by the diode 50 so that a small current flows through the coil 54 with no carrier signal or when the carrier signal below the threshold level. Under these conditions, the movable contact 56 does not engage the contacts 58 and 60 and the receiver output circuit which may be connected to the terminal 62 is not connected to the utilization circuit which may be connected to terminal 64. Thus, no noise from the receiver is applied to the utilization circuit in the absence of a carrier signal thereby minimizing the possibility of spurious operation of certain functions within an associated missile or aircraft.

A positive signal applied to the control grid 28 causes the current through the coil 54 to increase. When the current through the coil 54 increases to a predetermined value, the movable contact 56 engages the fixed contacts 58 and 60. The receiver output circuit at the terminal 62 is then connected to the utilization circuit at the terminal 64. An output voltage from a receiver applied to the terminal 62 may be used to control certain programming operations or other functions within a system involving a missile or aircraft.

The carrier operated relay 52 may be made operative by an automatic gain control voltage applied to the input terminal 38 and by a voltage from an intermediate frequency stage applied to the input terminal 34. The means for utilizing two sources of voltage to control the operation of a carrier operated relay is disclosed and claimed in a co-pending application, Serial No. 545,075 of Robert M. Spiegel, filed November 4, 1955, and assigned to the some assignee as the present invention.

The output voltage associated with an intermediate frequency stage is generally proportional to the strength of an incoming carrier signal when such a signal is relatively weak. However, when an incoming carrier signal reaches a certain level, a limiting action generally occurs and the output voltage from an intermediate frequency stage does not vary. On the other hand, a voltage obtained from an A.G.C. stage generally varies according to the strength of an incoming carrier signal and does not reach a saturated or limited level as does the voltage associated with an intermediate frequency stage. However, little or no A.G.C. voltage is generated when a very weak carrier signal is applied to a receiver.

If the automatic gain control voltage and the intermediate frequency voltage are both used to control the operation of the carrier operated relay, the threshold level to operate the carrier operated relay may be adjusted for both relatively strong and weak carrier signals. For weak signals below a certain level, the intermediate frequency signal voltage will have the greater effect upon the operation of the carrier operated relay. For strong signals above a certain level, the automatic gain control voltage will have the greater effect upon the operation of the carrier operated relay. When the combined voltage resulting from the automatic gain control voltage source and the intermediate frequency voltage source is used to control the operation of the carrier operated relay, the threshold level control may be varied to provide satisfactory operation for carrier signals of widely varying amplitudes.

At low signal levels, the output voltage from an intermediate frequency stage in an arrangement, such as illustrated, is relatively low. At such low signal levels, A.G.C. voltage is not provided to any great extent. Under these circumstances, the on-off differential of the relay 52 is relatively high in circuits known to be used heretofore. This on-off differential varied from approximately 5 to 1 to 1.5 to 1 depending upon the tubes used in the associated circuit. In order to decrease this on-off differential and thereby assure a positive action of the relay, it is necessary that weak signals be translated into corresponding voltages of much greater amplitude. Increasing the gain of the discharge device 10 to obtain voltages of greater amplitude tends to introduce instability into the system. Furthermore, the low voltage at the anode 14 makes it difficult to increase the gain to any great degree.

The present invention employs a feedback loop to increase the amplification of relatively low signal voltages, such as are obtainable from an intermediate frequency stage applied to the input terminal 34.

An intermediate frequency signal voltage, or other signal voltage corresponding to an incoming carrier signal, is amplified by the discharge device 10. The amplified A.C. signal is coupled through the capacitor 72 to the diode 74. During the negative half cycle of the A.C. signal, the diode 74 is conductive and acts as a half wave rectifier. The rectified voltage is filtered by a resistor 76 and a capacitor 78. The filtered D.C. voltage from the diode 74 is applied to the control grid 18 through the resistor 80.

The negative voltage fed back from the output circuit of the device 10 to the control grid 18 causes the anode 14 to become more positive. The increased positive voltage at the anode 14 is applied to the control grid 28 through the resistor 48.

It was found that a feedback arrangement, such as that illustrated, greatly reduced the on-off differential of the relay 52, especially for relatively weak carrier signals which were not sufficient in amplitude to generate an A.G.C. voltage in conventional receiver circuits.

In guided missiles and other pilotless craft, it is often desirable to control a plurality of functions from a ground station. In this case, a guidance receiver is designed to receive a plurality of sub-carrier signals imposed upon a single transmitted carrier signal. Each of the sub-carrier signals is used to operate a carrier operated relay, which in turn is associated with a utilization circuit within the missile.

Figure 2:
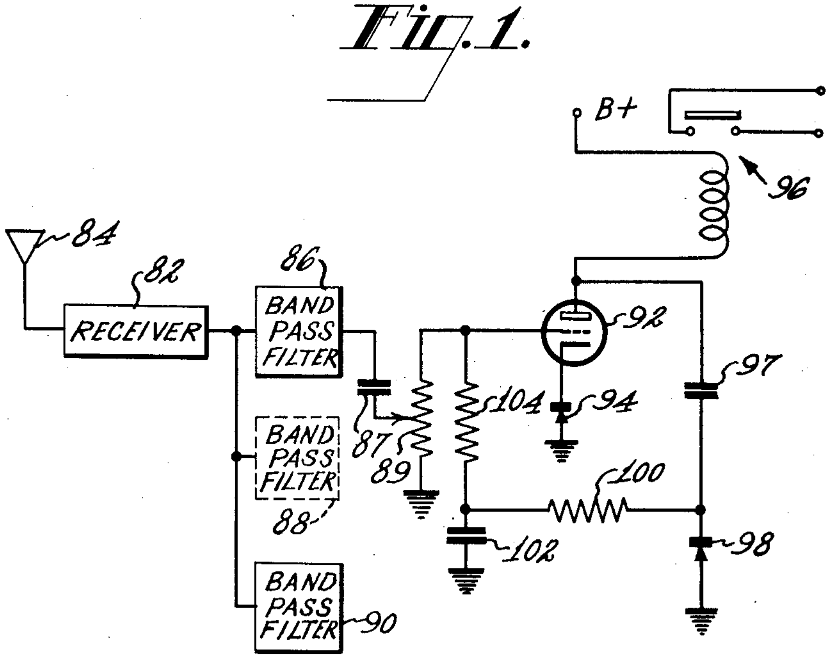
Figure 2 is a schematic representation, partly in block diagram form, of another embodiment of a carrier operated relay circuit, in accordance with the present invention.

Referring particularly to Figure 2, a guidance receiver 82 is adapted to receive a plurality of sub-carrier signals from an antenna 84. The output circuits of the receiver 82 are connected to a plurality of band-pass filters 86, 88 and 90. The number of band-pass filters may be greater than the three illustrated, the number depending upon the number of sub-carrier signals utilized in the system. For simplicity, only the circuit associated with the band-pass filter 86 is illustrated, it being understood that the other band-pass filters may be associated with similar type circuits. An electron discharge device 92 is biased close to cut-off by the current flowing in a diode 94. Under this condition, little current flows through the coil of the relay 96 which remains inoperative. When a sub-carrier signal is applied from the band-pass filter 86 through a coupling capacitor 87 and a variable resistor 89 to the electron discharge device 92, it is amplified. The amplified voltage, which may be A.C., is applied through a coupling capacitor to a diode 98, where it is rectified. The rectified voltage from the diode 98, which is positive in nature, is filtered by a resistor 100 and a capacitor 102. The filter D.C. voltage is applied to the control grid of the device 82 through a resistor 104. The positive feedback voltage from the anode to the control grid causes the current in the device 92 to increase. This arrangement assures positive action of the relay 96 and the on-off differential of the relay 96 is thereby considerably improved over arrangements used heretofore. The arrangement is particularly effective when the sub-carrier signals are relatively weak.

Figure 3:
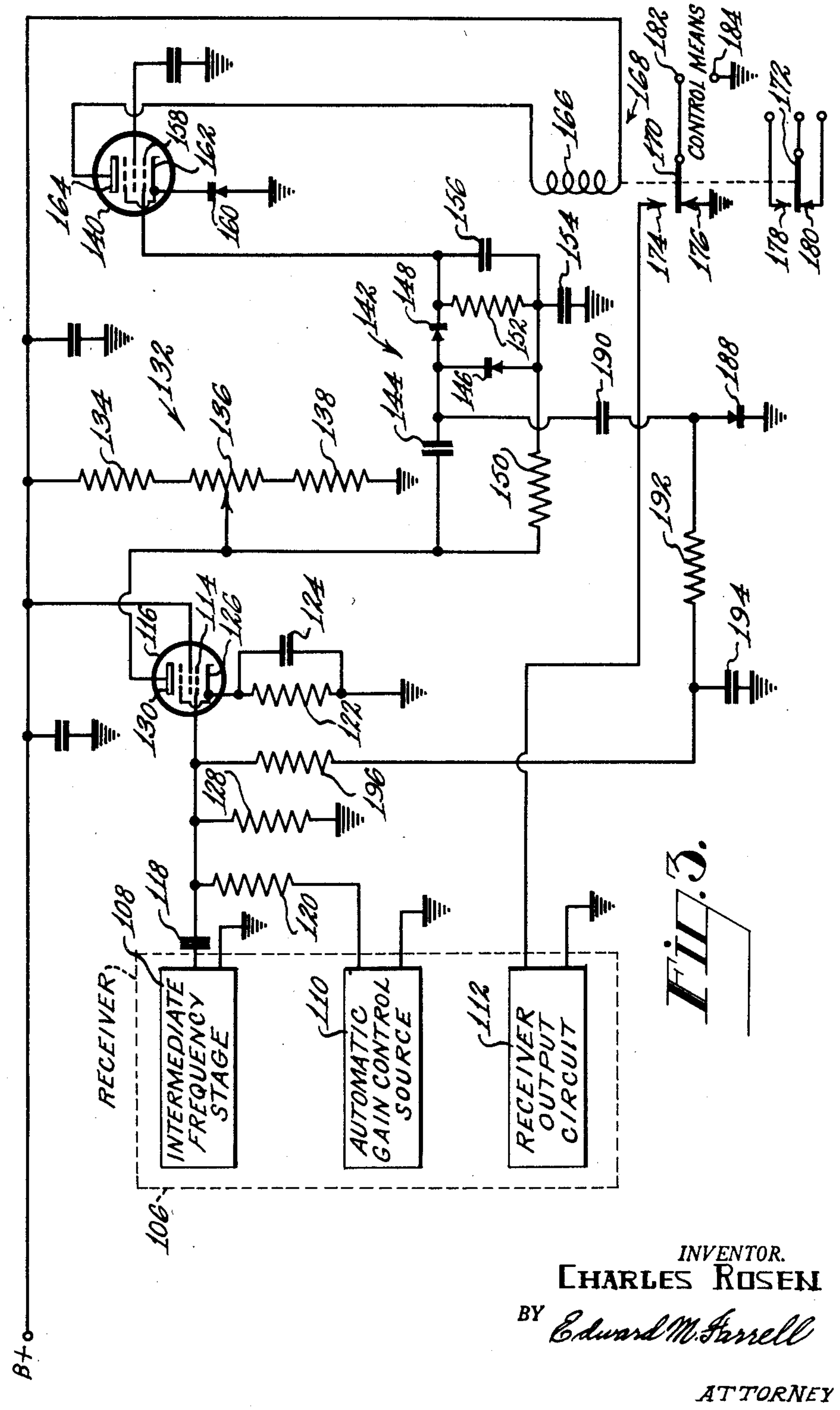
Figure 3 is a schematic representation, partly in block diagram form, of another embodiment of a carrier operated relay circuit, in accordance with the present invention.

Referring particularly to Figure 3, a receiver is illustrated by a dotted box 106. An intermediate frequency stage within the receiver is represented by a block 108. A source of automatic gain control voltage is represented by a block 110 and a receiver output circuit is represented by a block 112.

The output voltage from the intermediate frequency stage 108 is applied to the control grid 14 of an electron discharge device 116 through a coupling capacitor 118. The output voltage from a source of the automatic gain control voltage 110 is also applied to the control grid 114 through a resistor 120. Self-biasing means for the electron discharge device 116 are provided by a resistor 122 and a capacitor 124 connected between the cathode 126 and ground. A grid leak resistor 128 is connected between the control grid 114 and ground. The anode 130 is connected to B+ through a resistor network 132 comprising a resistor 134, a variable resistor 136, and a resistor 138 connected between B+ and ground.

The output voltage from the anode 130 is coupled to a second electron discharge device 140 through a coupling network 142. The coupling network 142 includes a form of voltage doubler comprising a capacitor 144, a pair of diodes 146 and 148, resistors 150 and 152, capacitors 154 and 156.

The output voltage from the coupling network 142 is applied to the control grid 158 of the electron discharge device 140. Self-biasing means for the device 140 are provided by a diode 160 connected between the cathode 162 and ground. The anode 164 is connected to B+ through a coil 166 of a carrier operated relay 168. The carrier operated relay 168 includes a pair of movable contact arms 170 and 172. The movable contact arm 170 is adapted to close one of the contacts 174 or 176. The movable contact arm 172 is adapted to close one of the contacts 178 or 180. The receiver output circuit 112 is adapted to be connected to a pair of output terminals 182 and 184 when the movable contact 170 engages the contact 174.

A feedback circuit includes a coupling capacitor 190 connected from the capacitor 144 to a diode 188. A filter network comprising a resistor 192 and a capacitor 194 is connected across the diode 188. The output voltage from the diode and the filter network is applied to the control grid 114 through a resistor 196.

In considering the operation of this circuit, the carrier operated relay 168 is maintained inoperative in the absence of a carrier or when the carrier signal is weaker than necessary to overcome the threshold level to operate the relay. The electron discharge device 140 is biased by a diode 160 so that a small current flows through the coil 166 when no carrier signal is applied to the system. Under these conditions, the movable contact arm 170 is grounded through the contact 176 and no receiver output voltage is applied to the terminals 182 and 184. Also, the movable contact arm 172 engages contact 180. No noise is applied to the terminals 182 and 184 in the absence of a carrier signal, minimizing the possibility of spurious operation of certain functions within an associated missile or aircraft.

When a positive signal is applied to the control grid 158, the current through the coil 166 increases. When the current through the coil 166 increases to a predetermined value, the movable contact arms 170 and 172 engage contacts 174 and 178, respectively. It is seen that the receiver output circuit 112 is connected to the output terminals 182 and 184 when the relay 168 becomes operative by a current through the winding 166. The contacts 178 and 180 may be connected to control various functions within a missile or aircraft. As determined by the position of the movable contact arm 172.

A feedback circuit is provided to reduce the on-off differential of the relay 168 when relatively weak carrier signals are applied to the receiver 106. The amplified A.C. signal from the anode 130 is applied to the diode 188 through the capacitor 144 and the coupling capacitor 190. The A.C. signal is rectified and filtered by the resistor 192 and the capacitor 194. The diode 188 is conductive during the negative half cycle of the A.C. signal. The rectified and filtered D.C. signal fed back to the control grid 114 through the resistor 196 is negative. The negative voltage fed back causes the anode 130 to become more positive. The increased positive voltage at the anode 130 is applied to the control grid 158 through the resistors 150 and 152 causing the current in the device 140 and the coil 166 to increase. If the incoming carrier signal is sufficient to overcome the threshold level, as determined by the setting of the resistor 136, the relay 168 will become operative. The output circuit 112 is then connected to control means at the terminals 182 and 184 to control certain functions or programming operations within the missile or other craft.

When the incoming carrier signal levels are relatively high, A.G.C. voltage is generated in the source 110. This voltage is amplified by the device 116, and applied to the device 140. In addition, the I.F. signal from the stage 108 is also amplified by the device 116. The amplified I.F. signal, after passing through the voltage doubling network 142, is also applied to the device 140. Thus, two sources of voltage control the operation of the relay 168, as described in the aforementioned pending patent application.

The on-off differential of the relay 168 is relatively small with strong carrier signals in an arrangement without the fedback circuit. The addition of the feedback circuit permits a minimum on-off differential of the relay 168 for a range of input carrier signals of widely varying strengths.

Other types of feedback arrangements may be employed in addition to the ones illustrated. For example, a voltage doubling circuit may be employed in the feedback loop circuit in the place of the half wave rectifier illustrated. Also, a full wave rectifier may be employed. Numerous arrangements may be employed wherein the polarity of the voltage fed back will tend to actuate the carrier operated relay employed in the system.

The following are some exemplary values and types of some of the components which may be employed in the circuit illustrated in Figure 1, which have proven satisfactory:

| | |
|---|---|
| Resistor 66 | 10,000 ohms. |
| Resistor 68 | 25,000 ohms. |
| Resistor 70 | 10,000 ohms. |
| Resistor 76 | 470,000 ohms. |
| Capacitor 72 | 360 micro-micro-farads. |
| Capacitor 78 | .01 micro-farads. |
| Diode 72 | Type 601C. |
| Diode 50 | Type A6B–6. |
| Vacuum Tube 10 | Type 5840. |
| Vacuum Tube 12 | Type 5840. |

What is claimed is:

1. A control circuit comprising a direct coupled amplifier having first and second amplifying devices each having an input and an output circuit, means for providing operating potential to said first and second amplifying devices, means for applying a carrier signal to said input circuit of said first amplifying device, rectifying means included in said output circuit of said first amplifying device, means for applying a D.C. voltage from said rectifying means to said input circuit of said first amplifying device, a relay connected in the space current path of said second amplifying device, means for biasing said second amplifying device to maintain said relay inoperative in the absence of a carrier signal of a predetermined amplitude, and means for applying the output voltage from said first amplifying device to said second amplifying device to control the operation of said relay.

2. A control circuit for minimizing the on-off differential of a carrier operated relay for relatively weak carrier signals comprising a direct coupled amplifier having first and second amplifying devices, means for applying operating potential to said first and second amplifying devices, means for applying a control voltage corresponding to a carrier signal to said first amplifying device, rectifying means included in the output circuit of said first amplifying device to convert said control signal into a corresponding D.C. voltage, means for applying said D.C. voltage from said rectifying means to the input circuit of said first amplifying device, means for biasing said second amplifying device to maintain said relay inoperative in the absence of a carrier signal of a predetermined amplitude, and means for directly coupling the output voltage from said first amplifying device to said second amplifying device to control the operation of said relay whereby the operation of said relay is dependent upon the amplitude of said carrier signal.

3. In a control circuit, means for connecting a receiver output circuit to a utilization circuit when a carrier signal of a predetermined amplitude is applied to said receiver and for disconnecting said receiver output circuit from said utilization circuit when a carrier signal is below a predetermined amplitude, a relay adapted to be actuated by a predetermined current therethrough, an electron discharge amplifying device having its space current path serially connected with said relay, an amplifier having input and output circuits, means for providing operating potential to said amplifying device and said amplifier, rectifying means included in said output circuit, means for applying a control voltage corresponding to said carrier signal from said receiver to said amplifier, means for coupling said rectifying means in said output circuit to said input circuit, and means for applying the output voltage from said amplifier to said electron discharge amplifying device to control the current therethrough.

4. In a control circuit for minimizing the on-off differential of a carrier operated relay for relatively weak carrier signals, a carrier operated relay for connecting a receiver output circuit to a utilization circuit when a carrier signal of a predetermined amplitude is applied to said receiver and for disconnecting said receiver output circuit from said utilization circuit when a carrier signal is below a predetermined amplitude, said carrier operated relay being adapted to be actuated by a predetermined current therethrough, a vacuum tube device having its space current path serially connected with said carrier operated relay, an input amplifier having input and output circuits, means for providing operating potential for said vacuum tube device and said input amplifier, means for applying a control voltage corresponding to said carrier signal from said receiver to said amplifier, rectifying means included in said output circuit to provide a D.C. voltage corresponding in amplitude to said carrier signal, means for coupling said D.C. voltage from said rectifying means to said input circuit whereby said D.C. voltage is amplified by said amplifier, and means for applying the output voltage from said amplifier to said vacuum tube device to control the current therethrough whereby the operation of said carrier operated relay is dependent upon the strength of said carrier signal.

5. A control circuit for minimizing the on-off differential of a carrier operated relay for relatively weak carrier signals comprising a direct coupled D.C. amplifier including first and second vacuum tube devices, said vacuum tube devices each having an anode, a cathode and a control grid, means for connecting said D.C. amplifier to a source of operating potential, a grid leak resistor connected between said cathode and control grid of said first vacuum tube, means for applying a control signal corresponding to a carrier signal to said grid leak resistor of said first vacuum tube device, a threshold level control connected between said source of operating potential and said anode of said first vacuum tube device, said threshold level control being also connected to said control grid of said second vacuum tube device, a carrier operated relay connected in the space current path of said second vacuum tube device, means for biasing said second vacuum tube device to render said carrier operated relay inoperative in the absence of a carrier signal of a predetermined amplitude as determined by a setting of said threshold level control, and a feedback loop including rectifying means connected between the input and output circuits of said first vacuum tube device.

6. In combination with a guidance receiver, a control circuit for minimizing the on-off differential of a carrier operated relay for relatively weak carrier signals comprising a direct coupled D.C. amplifier including first and second vacuum tube devices, said vacuum tube devices each having an anode, a cathode and a control grid, means for connecting said D.C. amplifier to a source of operating potential, a grid leak resistor connected in the input circuit of said first vacuum tube device, means for applying a control signal corresponding to a carrier signal to said grid leak resistor of said first vacuum tube device, a threshold level control connected between said source of operating potential and said anode of said first vacuum tube device, said threshold level control also being connected to said control grid of said second vacuum tube device to render said carrier operated relay inoperative in the absence of a carrier signal of a predetermined amplitude as determined by a setting of said threshold level control, the bias voltage of said second vacuum tube device being the difference between the voltage from said threshold level control and said cathode of said second vacuum tube device, and a feedback loop including rectifying means connected between the input and output circuits of said first vacuum tube device whereby said control signal is converted to a corresponding D.C. voltage, said D.C. voltage being amplified by said first vacuum tube device to control the operation of said carrier operated relay.

References Cited in the file of this patent

UNITED STATES PATENTS

| | | |
|---|---|---|
| 2,256,071 | Briick | Sept. 16, 1941 |
| 2,400,948 | Peterson | May 28, 1946 |

FOREIGN PATENTS

| | | |
|---|---|---|
| 1,082,697 | France | Dec. 31, 1954 |